United States Patent [19]

Pinder

[11] Patent Number: 5,789,098

[45] Date of Patent: Aug. 4, 1998

[54] METHOD OF DETECTING EXTERNAL VOLTAGE SOURCE FOR DISABLEMENT OF BATTERY CONSERVATION MODE IN A PORTABLE COMMUNICATIONS DEVICE

[75] Inventor: Ellis A. Pinder, Davie, Fla.

[73] Assignee: Motorola, Inc., Schaumburg, Ill.

[21] Appl. No.: 774,697

[22] Filed: Dec. 26, 1996

[51] Int. Cl.$^6$ ..................................................... H01M 2/00
[52] U.S. Cl. .......................... 429/61; 429/90; 429/92; 340/500; 340/501; 340/505; 340/514; 340/517; 340/539; 340/635; 340/636; 340/657; 340/660; 340/661; 340/662; 340/663; 307/112; 307/115; 307/116; 307/130; 307/134; 307/140
[58] Field of Search .................... 429/61, 90, 92; 340/500, 501, 514, 517, 539, 635, 636, 657, 660, 661, 662, 663, 505; 370/112, 115, 116, 125, 126, 130, 131, 134, 137, 140

[56] References Cited

U.S. PATENT DOCUMENTS

| | | | |
|---|---|---|---|
| 4,381,552 | 4/1983 | Nocilini et al. | 364/900 |
| 5,324,990 | 6/1994 | Cunningham | 307/125 |
| 5,565,714 | 10/1996 | Cunningham | 307/112 |

*Primary Examiner*—Bruce F. Bell
*Attorney, Agent, or Firm*—Frank M. Scutch, III

[57] ABSTRACT

A portable communication device with battery conservation capability is capable of sensing (223) its power source and suppressing a battery conservation circuit depending on an actual voltage determined (225) from an analog-to-digital converter. Two or more voltage ranges are defined (227) such that battery conservation is disabled when an external power source is operated in one of the predetermined voltage ranges.

15 Claims, 6 Drawing Sheets

1

METHOD OF DETECTING EXTERNAL VOLTAGE SOURCE FOR DISABLEMENT OF BATTERY CONSERVATION MODE IN A PORTABLE COMMUNICATIONS DEVICE

TECHNICAL FIELD

This invention relates in general to portable communications devices and more specifically to battery conservation in portable two-way radios.

BACKGROUND

The useful operational period of a portable communication device, such as a two-way radio, is limited by the capacity of the device's battery. It is common for the user of such a device to not receive a call or message for an extended period of time, but it is necessary for the communication device to remain powered to ensure the message will be received when it is eventually transmitted. Although this "standby" mode of the device generally consumes less power than the transmitting or receiving modes, a good opportunity for extending battery life exists while in this state. This results from the fact that the device, under typical operation, spends a large percentage of its time in standby mode.

A common method of battery conservation, commonly referred to as "battery save", operation while in standby mode is to periodically power the necessary components of the communication device for a brief period to check for channel activity, a data message, etc. If a communication infrastructure is involved, the wake-up may be synchronized so the device is fully active in a time slot where a potential message may arrive. Once the device is awake and has determined there is no message or call, the device shuts off components or subsystems during a "sleep period" to minimize power dissipation. By alternating between sleep and non-sleep modes while in standby mode, the time-averaged power dissipation is superior than continuous operation in non-sleep mode.

The disadvantage of having a device in battery save mode is that a message latency is incurred. Depending on the exact nature of the communication device, this latency will likely result in one of two problems:

the message is delayed, but still received in full; or the detection of the message is delayed, resulting in the first portion of the message being lost.

In many operational situations, such a trade-off is acceptable. The user is willing to accept the inconvenience of receiving a "clipped" first message in return for extended battery life. The user, however, may choose to operate the device without a battery using a household or vehicular adapter. In such a situation, battery save operation provides no useful benefit to the user of the device. It would be highly desirable for the radio to automatically detect it is being powered by a non-battery (or external) source and to suppress the operation of the battery save feature.

DETAILED DESCRIPTION OF THE PREFERRED EMBODIMENT

A communication device with battery conservation or "save" capability is capable of sensing its power source and suppressing battery save capability provided a external power source is used to operate the device. The device contains a plurality of operational voltage ranges, with one such range defined as the battery operating range. The battery operating range specifies the range of voltages in which the device will operate on battery power, from new, charged, or "fresh" batteries, to weak batteries. The lower bounds of this range may be further defined or limited by characteristics of the device, such as the minimum operating voltage of the device.

A second operational voltage range, mutually exclusive with the first, is defined as the External voltage range. When the device is being powered by an external power source, such as a household AC or a vehicular adapter, the device operates in this range.

The device is able to periodically sample its supply voltage, and by comparing the sampled voltage to the two defined ranges, the device is able to make a determination as to its power source. If the device determines that it is being powered from an external source, then battery save operation is suppressed.

Figure 1:
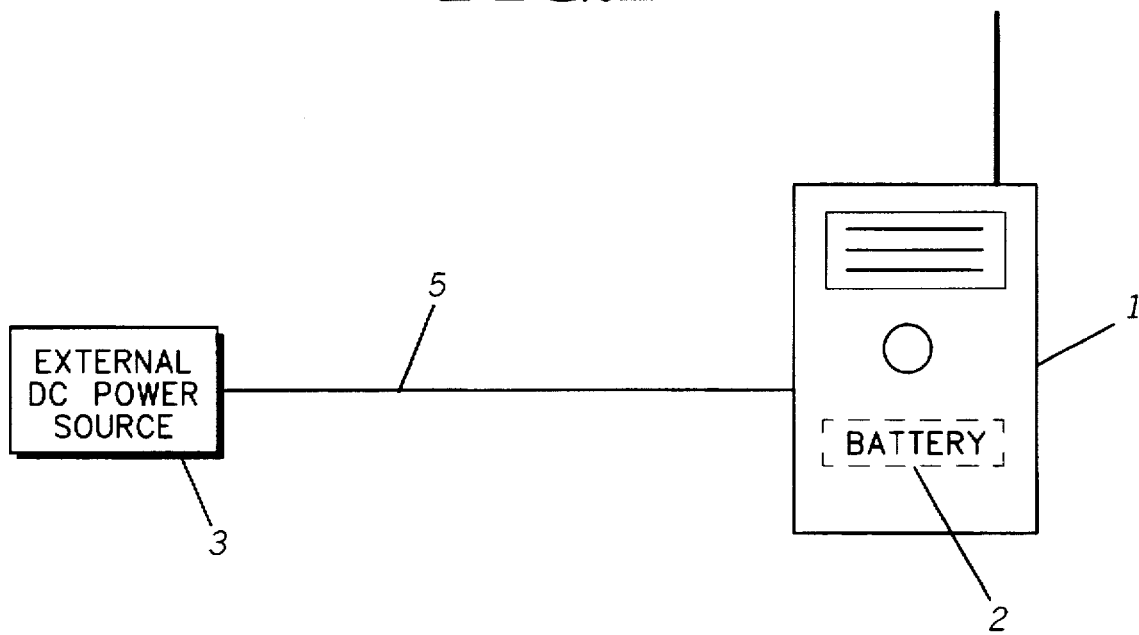
FIG. 1 is a block diagram showing an internal battery source and an external power source connected to a portable two-way communications device.

In FIG. 1, a portable communications device such as a portable two-way radio 1 utilizes an internal battery source 2 or may be attached to an external power source 3 such as a direct current (DC) power supply or battery charger. The two-way radio 1 is connected using an interconnect cable 5 which is used to supply the appropriate voltage to the radio 1 either for charging the internal batteries and/or providing an external source of supply voltage.

Figure 2:
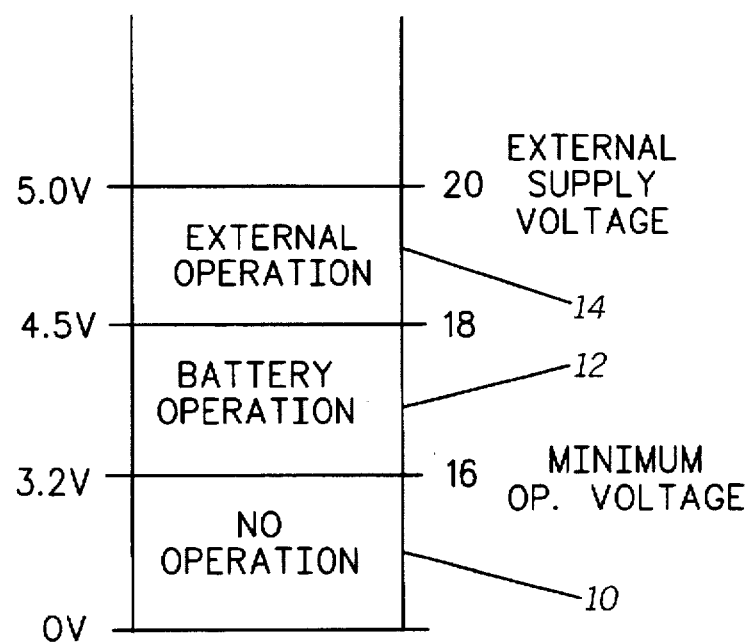
FIG. 2 is a pictorial diagram showing typical operating voltage ranges and levels depicting operational modes of the portable communications device.

Referring now to FIG. 2, two contiguous voltage ranges, battery operating range 12 and external operating range 14 illustrate two ranges in which the portable communications device can maintain operation. A default range 10 is also shown where device operation is not possible because the supply voltage is below the minimum operating voltage of the device. Operating the device using new batteries will yield an initial supply voltage near level 18 located at substantially the top of the battery operating range 12. As the batteries discharge, device operation continues until minimum operating voltage is reached at level 16.

Operating the device from a external source would yield external supply voltage 20, which is in the external operation range 14. External operating range 14 is typically chosen to be just above the maximum possible battery voltage.

Figure 3:
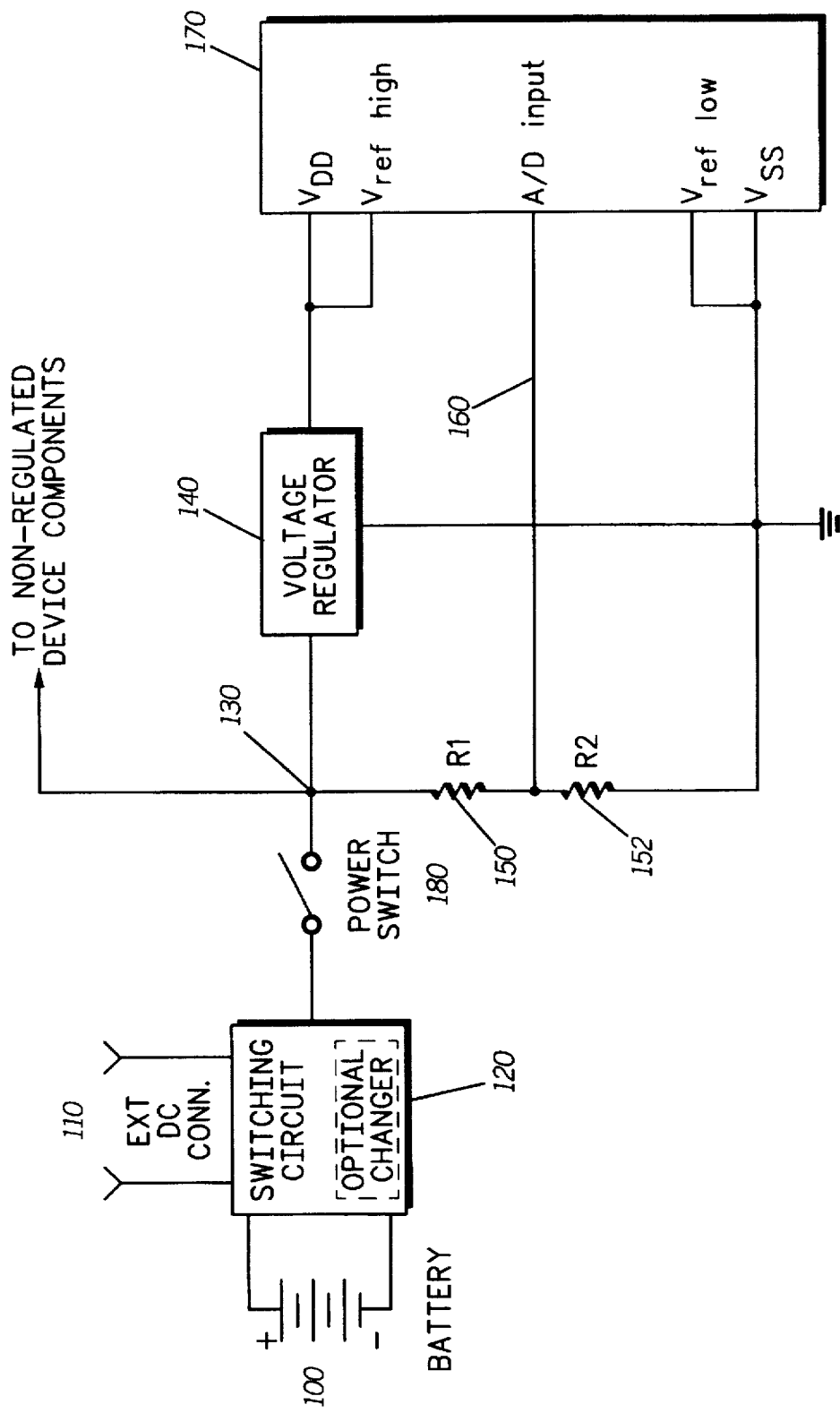
FIG. 3 is a block diagram showing the operation of battery save mode according to the preferred embodiment of the invention.

Referring to FIG. 3, the device consists of a battery 100 and a connector 110 for connection to an external direct current (DC) source. The battery 100 and connector 110 are connected to a switching circuit 120 which is responsible for disconnecting the battery 100 if an external DC source is present. The switching circuit 120 may also include the capability to charge the battery 100.

The supply voltage of the device, measured at 130, is that voltage previously discussed in FIG. 2 as the voltage at level 18. This voltage powers non-regulated components of the device, and is the input to a voltage regulator 140 that powers regulated components, including the microcontroller 170. The microcontroller 170, which contains an analog-to-digital converter (ADC), senses a voltage on line 160. Sense line 160 is voltage divided from supply voltage 130 by resistors 150 and 152 to maintain sense line 160 within the bounds of the ADC. The microcontroller 170, by sampling the voltage on sense line 160, and by compensating for the voltage division by resistors 150 and 152, is able to calculate the supply voltage 130. The microcontroller, knowing voltage ranges 12 and 14 as defined previously in FIG. 2, is able to determine whether the device is operating on battery power or on external power, and is able to change the operational characteristics of the device.

Figure 4:
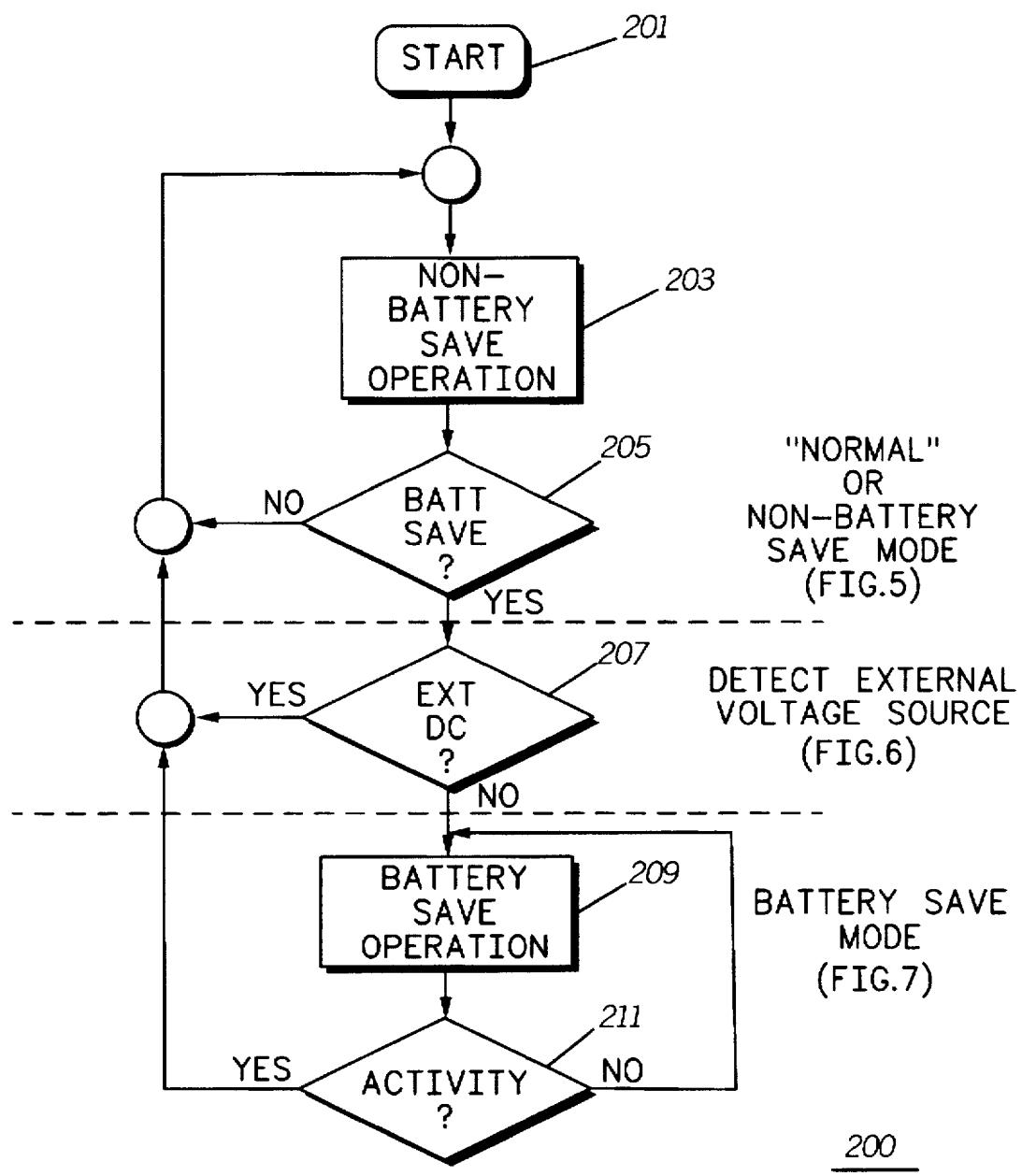
FIG. 4 is a flow chart depicting the method used by the portable communications device in accordance with the preferred method of the invention.

In FIG. 4, a flowchart of the preferred method 200 of practicing the invention includes activating or starting 201 the portable communications device where it first enters 203 a non-battery save mode where no attempt is made to conserve current drain on an internal power source. After a predetermined time, it is determined 205 whether to enter a battery save mode. The battery save mode is initiated in order to reduce current drain and conserve overall battery life. As is known to those skilled in the art, there are many techniques available to conserve battery current including limited system operation or periodic deactuation of specific systems or components. If the battery save mode is not initiated, the system reenters the non-battery save operation 203 until such time another determination is made.

If an external DC power source is connected to the portable communications device, the preferred method of the invention provides that the battery save mode or operation 209 will not be entered and the portable communications device remains in a non-battery save mode or operation 203. In normal operation where no external DC power source is connected, the battery save operation is initiated 209 until such time predetermined activity is detected 211. Upon this detection, the portable communications device then reenters the non-battery save operation 203.

Figure 5:
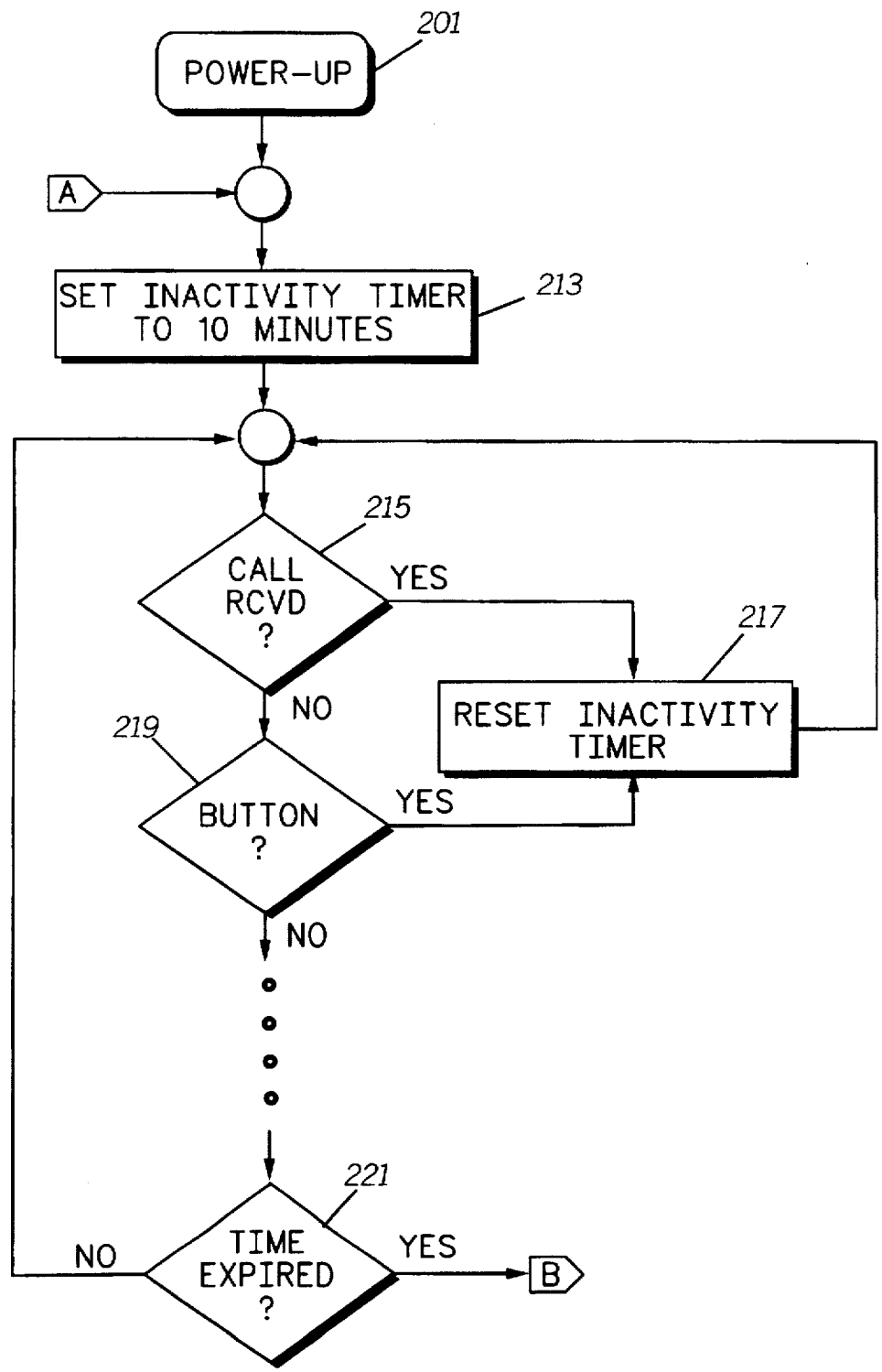
FIGS. 5, 6 and 7 are flow charts depicting operational details of the method shown in FIG. 4.
Figure 6:
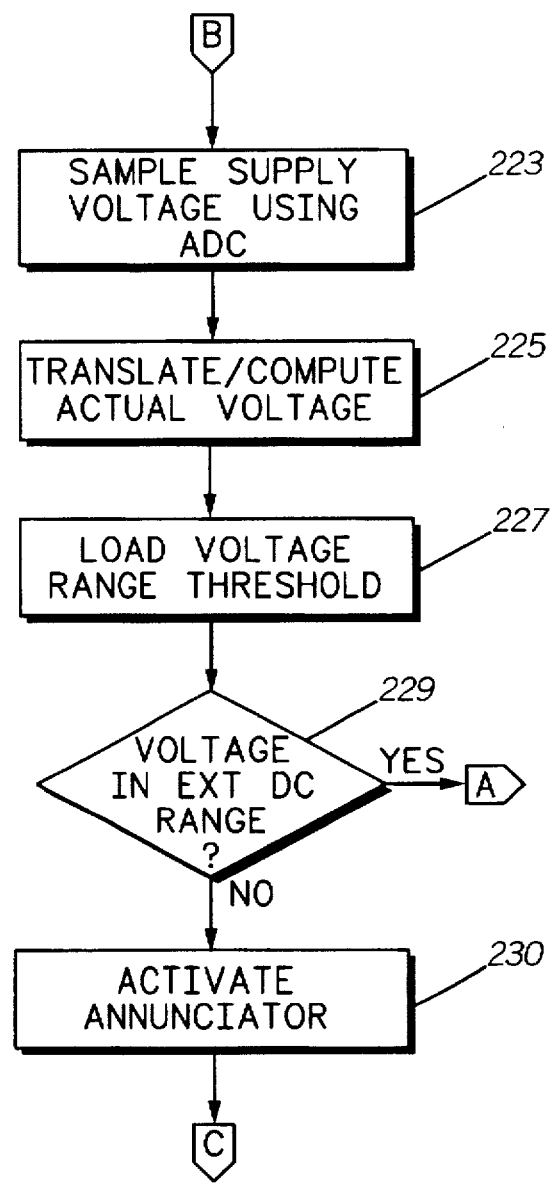
Figure 7:
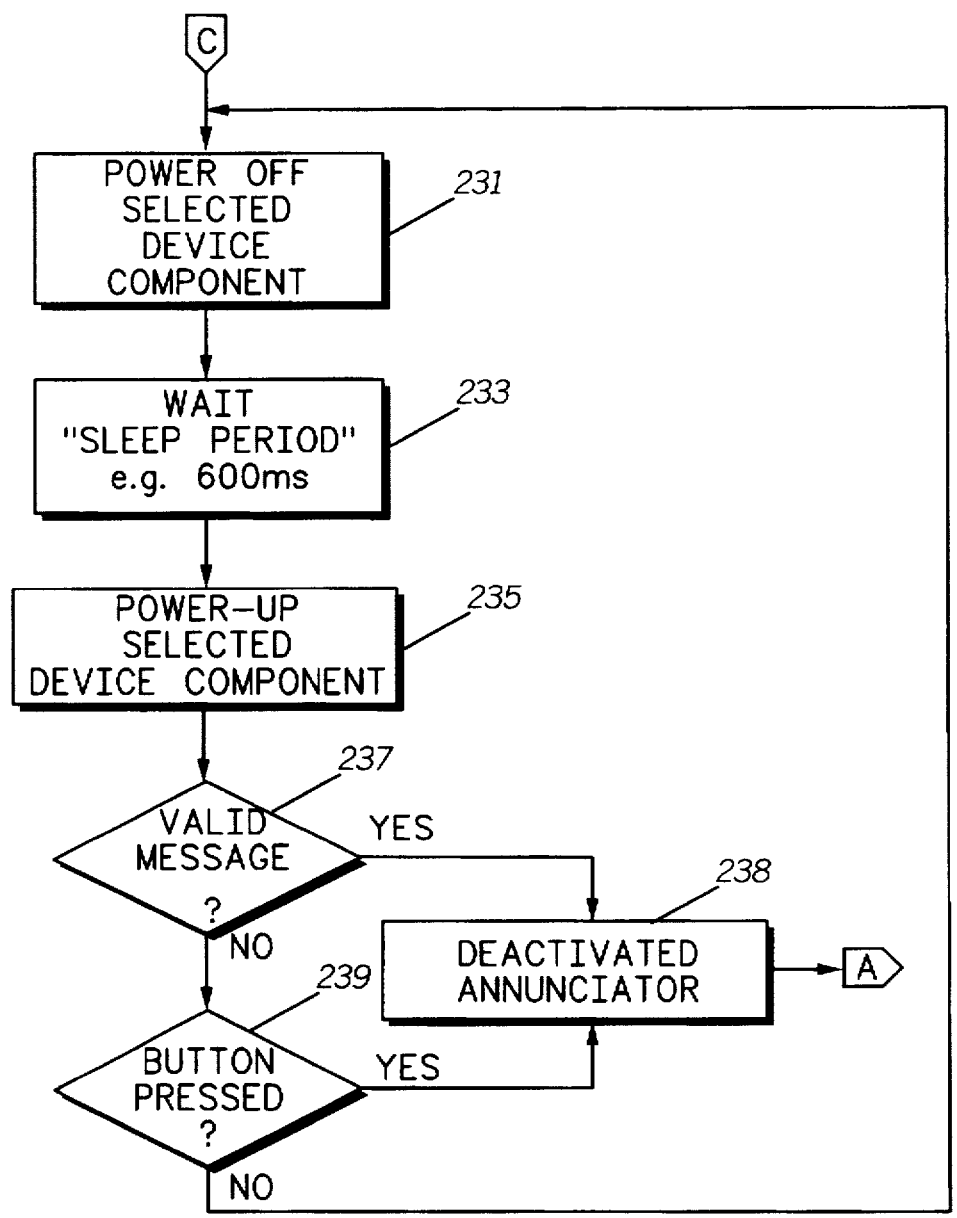

FIGS. 5, 6 and 7 are flowcharts showing further details of the method as shown in FIG. 4. In FIG. 4, normal operation of the portable communication device is depicted in the non-battery save mode. After turned on at power-up 201, an inactivity timer is set 213 to a predetermined time. Each time an incoming call or communication is received 215 or a button is depressed or actuated 219 on the portable communications device, the inactivity timer is reset 217 to the predetermined time. If the timer expires 221, the portable communications device will enter the battery save operation B shown in FIG. 6.

FIG. 6 shows a detailed flow chart of the portable communication device during battery save operation. When entering the battery save operation, a sample of the supply voltage is made using the ADC. The supply voltage is defined as that voltage supplied to the portable communications device either through use of the internal battery source or through an external power device. This is typically accomplished using a comparator circuit or the like located within the ADC. This sampled voltage is then translated 225 such that the actual DC voltage is computed from the sample. This translation can be accomplished by a microcontroller either by a linear voltage conversion or through the use of a look-up table. As will be recognized by those skilled in the art, these actual voltage values may be loaded from tables in read only memory (ROM) or through the use of non-volatile memory.

Predetermined voltage range thresholds are then selected 227 from the actual voltage computation such that it can be determined if an external power source is being supplied instead of the internal battery supply. For example, a plurality of voltage ranges may be selected between X volts and Y volts such that if the voltage is below X, the portable communication device cannot function properly. If the voltage is in a range above X volts but below Y volts the portable communications device is operating on it's internal battery source. If the voltage range is above Y volts, this indicates that an external DC source is being used and it is impractical and unnecessary to enter battery save operation.

In FIG. 7, a detailed flow chart is shown that depicts the portable communication device entering the battery save operational mode. This entails disabling 231 the portable communications device or alternatively selected device components for predetermined periods of time. This typically is done rapidly and ranges from 300 milliseconds to 900 milliseconds. Thus, the portable communication device will enter 233 an inactive or "sleep" period to conserve current drain from the internal battery. Upon expiration of the predetermined time the portable communication device is switched 235 so the previously disable device components are re-activated to an "on" state. Or alternatively, before expiration of the sleep period, if a valid message is received 237 or a switch on the portable communications device is pressed 239, the battery save operation will end and the portable communications device will resume the non-battery save operational mode.

Thus, the portable communication device with battery save capability is capable of sensing or detecting its power source i.e. either internal or external and suppressing battery conservation capability if an external power source is used to operate the device. The device contains a plurality of operational voltage ranges, with one such range defined as the battery operating range and the other as the external DC source operating range. When the supply voltage is detected in the second operating range, the battery conservation mode is disabled.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of detecting a voltage source type supplied to a portable communications device, the portable communications device having a battery conservation mode for reducing current drain on the voltage source, the method comprising the steps of:

detecting a user selected voltage at a set location at the portable communications device;

defining a first voltage range and second voltage range;

determining if the detected voltage is within the first voltage range or the second voltage range; and disabling the battery conservation mode in response to a detected voltage in the second voltage range.

2. A method as in claim 1, wherein an internal battery supply of the portable communications device is within the first voltage range and an external direct current (DC) supply is in the second voltage range.

3. A method as in claim 1, wherein the detecting step includes the step of:

sampling the voltage using an analog-to-digital (A/D) converter; and translating the sampled voltage into an actual voltage value.

4. A method as in claim 3, wherein the step of translating includes using a linear voltage translation.

5. A method as in claim 3, wherein the step of translating includes using a look-up-table.

6. A method as in claim 1, further including the steps of:
defining a third voltage range that is less than the first voltage range; and
inactivating the portable communications device when the third voltage range is detected.

7. A method as in claim 1, further including the step of actuating an annunciation when in the second voltage range.

8. A method of detecting an external voltage source for disablement of a battery conservation mode in a portable communications device having an internal battery source, the method comprising the steps of:
detecting a user selected supply voltage to the portable communications device;
sampling the supply voltage using an analog-to-digital converter to obtain a digital voltage value;
computing an actual voltage value from the digital voltage value;
establishing a first voltage range below a value of the internal battery source;
establishing a second voltage range at substantially the voltage of the internal battery source;
establish a third voltage range at substantially the voltage of an external voltage source; and
disabling the battery conservation mode when the supply voltage is detected in the third voltage range.

9. A method as in claim 8, wherein the actual voltage value is computed by a linear voltage translation.

10. A method as in claim 8, wherein the actual voltage value is computed from a look-up-table.

11. A method as in claim 8, further including the step of:
actuating an annunciator when in the third voltage range.

12. A method of disabling a battery conservation circuit for conserving battery life in a portable two-way radio, wherein the portable two-way radio is operated from a user selected supply voltage of either an internal battery source or an external direct current (DC) power source, the method comprising the step of:
computing a digital supply voltage of the portable two-way portable radio using an analog-to-digital converter;
converting the digital supply voltage to an actual supply voltage;
determining a first voltage range based upon the voltage of the internal battery source;
determining a second voltage range based upon the voltage of the external direct current (DC) power source; and
disabling the battery conservation circuit if the actual supply voltage is in the second voltage range.

13. A method as in claim 12, wherein the actual supply voltage is determined through a linear voltage translation.

14. A method as in claim 12, wherein the actual supply voltage is determined through a look-up-table.

15. A method as in claim 12, further including the step of:
actuating an annunciator when the supply voltage is in second voltage range.

* * * * *